United States Patent
Deivasigamani et al.

(10) Patent No.: US 12,379,697 B2
(45) Date of Patent: Aug. 5, 2025

(54) THERMAL BATTERY OPERATIONAL CONDITION MONITORING AND ALERT SYSTEM

(71) Applicant: Intellihot, Inc., Galesburg, IL (US)

(72) Inventors: Sridhar Deivasigamani, Mundelein, IL (US); Sivaprasad Akasam, Round Rock, TX (US)

(73) Assignee: Intellihot, Inc., Galesburg, IL (US)

( * ) Notice: Subject to any disclaimer, the term of this patent is extended or adjusted under 35 U.S.C. 154(b) by 172 days.

(21) Appl. No.: 18/135,355

(22) Filed: Apr. 17, 2023

(65) Prior Publication Data
US 2024/0344781 A1  Oct. 17, 2024

(51) Int. Cl.
*F28D 20/00* (2006.01)
*G05B 13/04* (2006.01)

(52) U.S. Cl.
CPC ....... *G05B 13/042* (2013.01); *F28D 20/0034* (2013.01); *G05B 13/048* (2013.01)

(58) Field of Classification Search
CPC .... G01N 29/024; Y02E 60/14; F28D 20/0034
See application file for complete search history.

(56) References Cited

U.S. PATENT DOCUMENTS

| | | | |
|---|---|---|---|
| 2008/0215248 A1* | 9/2008 | Magalhaes Mendes | G01N 29/036 702/19 |
| 2014/0261693 A1* | 9/2014 | Geerligs | E03B 7/12 137/59 |
| 2019/0107513 A1* | 4/2019 | Kolesnikov | G01N 29/4427 |

FOREIGN PATENT DOCUMENTS

KR   20180127722 A   * 11/2018

OTHER PUBLICATIONS

Agri-Energy Research LLC, https://web.archive.org/web/20220928220625/https://www.agrienergyresearch.com/coolant-correction-calculator, Sep. 28, 2022 (Year: 2022).*

* cited by examiner

*Primary Examiner* — Eric S Ruppert
(74) *Attorney, Agent, or Firm* — Jona Patent Firm; Cheng Ning Jong; Tracy P. Jong

(57) ABSTRACT

A method for determining the suitability of a thermal storage medium of a thermal battery based in a locale, the method including predicting a required concentration of the thermal storage medium based on historical temperature data of the locale and predicted temperature data of the locale, wherein the required concentration of the thermal storage medium is predicted based upon a concentration of the thermal storage medium corresponding to the historical temperature data and the predicted temperature data and determining the concentration of the thermal storage medium and comparing the concentration of the thermal storage medium to the required concentration of the thermal storage medium, wherein if the required concentration of the thermal storage medium is higher than the concentration of the thermal storage medium, the thermal storage medium is said to be unsuitable.

11 Claims, 9 Drawing Sheets

| Water (% Vol.) | Glycol (% Vol.) | Response (ms) |
|---|---|---|
| 100 | 0 | 79.84 |
| 80 | 20 | 88.79 |
| 66.66 | 33 | 94.24 |
| 57.14 | 43 | 97.6 |
| 50 | 50 | 99.99 |
| 42.85 | 57 | 100.6 |
| 33.33 | 67 | 98.6 |
| 20 | 80 | 94.4 |
| 0 | 100 | 94.2 |

FIG. 3

| Required Glycol (% Vol.) Vs. Temp | | | |
|---|---|---|---|
| Glycol % by Vol. | Temp °F | Glycol % by Vol. | Temp °F |
| 50 | -27.58 | 33 | 3.92 |
| 49 | -25.24 | 32 | 5.36 |
| 48 | -22.9 | 31 | 6.62 |
| 47 | -20.74 | 30 | 7.88 |
| 46 | -18.58 | 29 | 9.14 |
| 45 | -16.6 | 28 | 10.22 |
| 44 | -14.44 | 27 | 11.48 |
| 43 | -12.64 | 26 | 12.56 |
| 42 | -10.66 | 25 | 13.64 |
| 41 | -8.86 | 24 | 14.72 |
| 40 | -7.06 | 23 | 15.62 |
| 39 | -5.26 | 22 | 16.7 |
| 38 | -3.64 | 21 | 17.6 |
| 37 | -2.02 | 20 | 18.5 |
| 36 | -0.4 | 15 | 22.46 |
| 35 | 1.04 | 10 | 26.06 |
| 34 | 2.48 | 5 | 29.12 |

| Zip code | 55401 |
|---|---|
| Forecasted Minimum Temperature (deg F) | 18.7 |
| Historical Minimum Temperature (deg F) | 13.8 |
| Required Glycol Concentration by Vol. (%) | 25 |
| Current Glycol Concentration by Vol. (%) | 20 |

| Total Tank Volume (Gal.) | 60 |
|---|---|

| | Glycol Concentration % | Water (Gal.) | Glycol (Gal.) |
|---|---|---|---|
| Desired Glycol Concentration | 25 | 45 | 15 |
| Actual Glycol Concentration | 20 | 48 | 12 |
| Remaining Volume of Actual Medium | | 45 | 11.25 |
| Need Additional Volume of Actual Glycol | | | 3.75 |
| Required Drain Volume of Medium | | 3 | |
| Actual Drain Volume of Medium | | 5 | |
| Remaining Volume of Actual Medium | | 44 | 11 |
| Added Glycol | | | 5 |
| Final Volume of Medium | | 44 | 16 |
| Actual Glycol Concentration | 27 | | |

*FIG. 9*

THERMAL BATTERY OPERATIONAL CONDITION MONITORING AND ALERT SYSTEM

BACKGROUND OF THE INVENTION

1. The Field of the Invention

The present invention relates to a thermal battery operational condition monitoring and alert system. More specifically, the present invention is directed to a thermal battery operational condition monitoring and alert system for a thermal battery utilizing a glycol-water mixture as its heat transfer medium.

2. Background Art

The use of glycol-water mixtures in thermal transfer-related applications is not new. For instance, in transportation, glycol-water mixtures are used in radiators for dissipating heat while resisting freezing in cold climates. More recently, an increased number of applications have ventured into heat storage for use in water and space heating. However, such uses are typically not accompanied by maintenance activities to ensure that the glycol-water mixtures are still suitable to perform to their intended thermal transfer duties and more particularly to perform to their intended thermal transfer duties in the uncontrolled or outdoor climate. Leaks and evaporations can occur and can inadvertently affect the amount of a heat transfer mixture that is available for use in its intended purposes. Therefore, maintenance of such mixture is important not only during scheduled maintenance with intervals of months but also maintenance that can be more cost effectively performed during normal operations of the thermal batteries. Many equipment, e.g., refractometers, especially laboratory-grade refractometers are costly to procure and involve one or more manual steps in obtaining the concentration of a substance in a mixture and are therefore impractical for use with applications which require routine, e.g., daily sampling. Further, a refractometer functions according to principles of refractive indices which cause the measurements to be temperature dependent, adding to potential inaccuracies that can arise and also complexities in computing concentrations. Further, a refractometer may not be used for another purpose in a thermal battery system but to provide concentration values of the thermal battery contents, thus requiring this dedicated and additional piece of equipment to be made available which incurs additional costs.

There exists a need for an automated, simple and multi-purpose and cost-effective sensor for detecting the suitability or concentration of a substance of a heat transfer working liquid.

SUMMARY OF THE INVENTION

In accordance with the present invention, there is provided a method for determining the suitability of a thermal storage medium of a thermal battery based in a locale, the method including:
(a) predicting a required concentration of the thermal storage medium based on historical temperature data of the locale and predicted temperature data of the locale, wherein the required concentration of the thermal storage medium is predicted based upon a concentration of the thermal storage medium corresponding to the historical temperature data and the predicted temperature data; and
(b) determining the concentration of the thermal storage medium and comparing the concentration of the thermal storage medium to the required concentration of the thermal storage medium, wherein if the required concentration of the thermal storage medium is higher than the concentration of the thermal storage medium, the thermal storage medium is the to be unsuitable.

In one embodiment, the thermal storage medium includes glycol. In one embodiment, the predicted temperature data is a part of weather forecast data of the locale. In one embodiment, the predicting step includes resolving the required concentration of the thermal storage medium to be a concentration of the thermal storage medium corresponding to the lower of the historical temperature data and the predicted temperature data. In one embodiment, the determining step includes transmitting a signal of a waveform in a portion of the thermal storage medium; and receiving the signal of the waveform disposed at a pulse width and looking up the concentration of the thermal storage medium on a signal pulse width-thermal storage medium concentration relationship based on the pulse width. In one embodiment, the waveform is a square waveform. In one embodiment, the locale is specified by a zip code.

In accordance with the present invention, there is further provided a method for determining the concentration of a solute in a thermal storage medium, the method including:
(a) transmitting a signal of a waveform in a portion of the thermal storage medium; and
(b) receiving the signal of the waveform disposed at a pulse width and looking up the concentration of the solute in the thermal storage medium based on a signal pulse width-solute concentration in thermal storage medium relationship corresponding to the pulse width.

In one embodiment, the thermal storage medium is a glycol-water mixture. In one embodiment, the signal pulse width-solute concentration in thermal storage medium relationship is established using a method including establishing the signal pulse width-solute concentration in thermal storage medium relationship using at least readings of signal pulse width of at least two different solute concentrations in thermal storage medium. In one embodiment, the waveform is a square waveform. In one embodiment, if the receiving step fails to receive the signal of the waveform within a predetermined amount of time, it is said that there is an insufficient level of the thermal storage medium.

In accordance with the present invention, there is further provided a method for determining a modification of the concentration of a solution in a container to meet a target concentration of the solution in a limited volume of a container, the method including:
(a) determining an actual total volume of the solution and a concentration of the solute in the solution;
(b) determining an additional volume of the solute required to result in a concentration of the solution that is at least at the target concentration;
(c) determining whether an aggregate of the actual total volume of the solution and the additional volume of the solute required exceeds the limited volume, wherein if the aggregate does not exceed the limited volume, the additional volume of the solute required is determined to be needed to turn the actual total volume of the solution into a solution at the target concentration; and
(d) if the aggregate exceeds the limited volume, determining a required drain volume from the container and an additional volume of solute required to be added to container to result in a solution at least at the target concentration.

In one embodiment, the method further includes a modification selected from the group consisting of a modification of the required drain volume to one or more times of a fixed volume, a modification of the additional required volume of solute to one or more times of a fixed volume and a combination thereof. In one embodiment, the solute is glycol and the solution is a glycol/water mixture. In one embodiment, the method further includes limiting the target concentration to about 50% solute by volume. In one embodiment, the fixed volume is the volume of a 5-gallon bucket.

An object of the present invention is to provide a method for determining a required concentration of a thermal battery medium and a method for getting the concentration of the thermal battery medium to a required level to ensure that the thermal battery medium will function as intended under severe ambient temperature conditions.

Another object of the present invention is to provide a device suitable not only for determining the concentration of a solute in a solvent but also for determining a liquid level.

Another object of the present invention is to provide a device and method for determining the concentration of a solute in a solvent that is cost effect and one that requires little maintenance in outdoor conditions.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 is a table depicting example response times representing pulse widths of the transmitted square waveforms at various glycol concentrations.

FIG. 5 is a table depicting example required glycol concentrations with respect to ambient temperature values.

FIG. 9 is a diagram depicting various considerations affecting the manner in which the concentration of a volume-limited application is modified.

PARTS LIST

Figure 1:
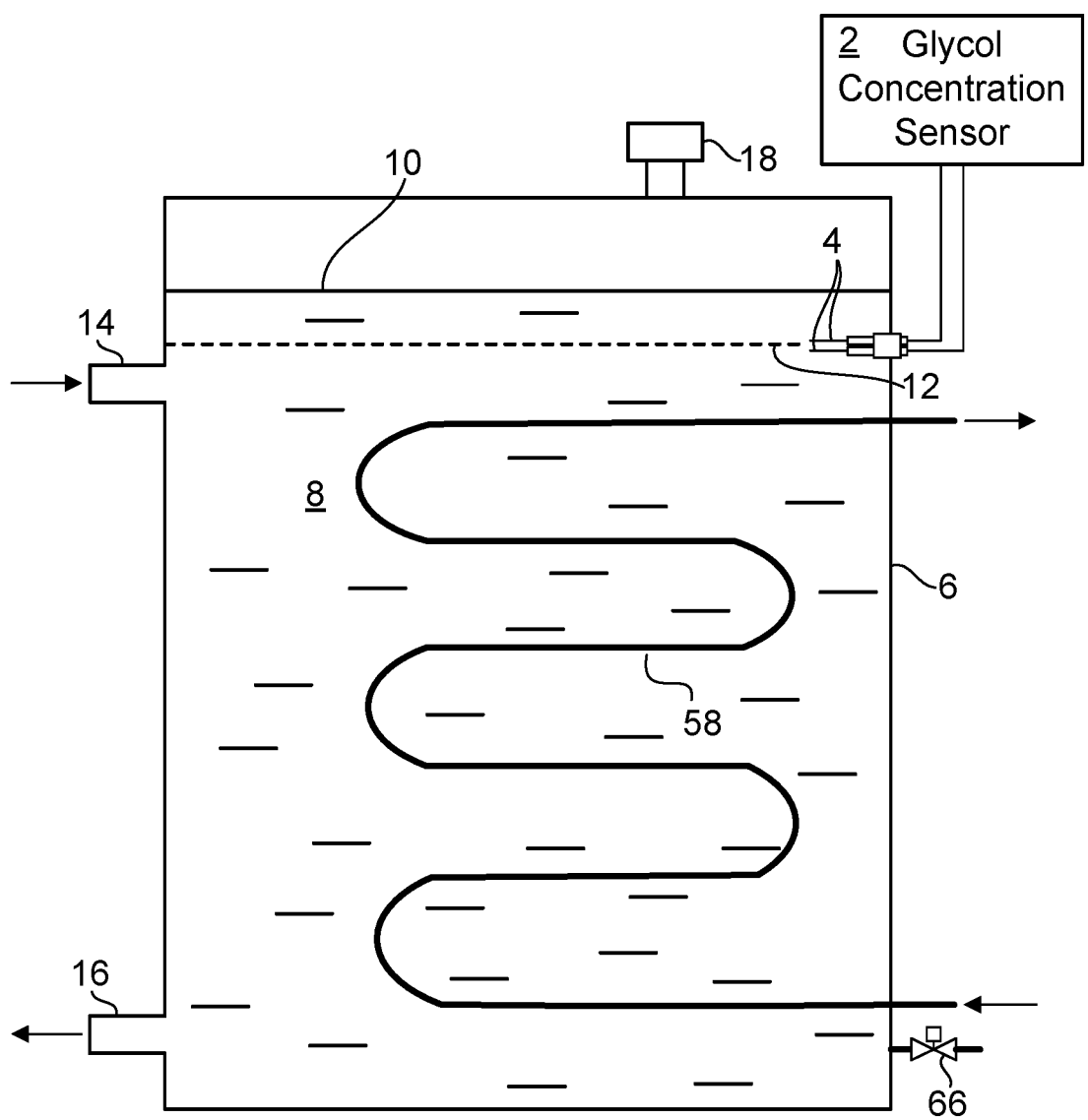
FIG. 1 is a diagram depicting the use of a pair of electrodes configured for use as a glycol concentration sensor.

2—glycol concentration sensor
4—electrodes
6—thermal battery
8—glycol mixture, e.g., glycol-water mixture
10—normal level of glycol-water mixture
12—low level of glycol-water mixture
14—inlet of glycol-water mixture
16—outlet of glycol-water mixture
18—vent port of thermal battery
20—table showing response times representing pulse widths relative to glycol concentrations in glycol-water mixture
22—column representing percentage of water by volume
24—column representing percentage of glycol by volume
26—column representing pulse widths
28—plot representing pulse widths relative to glycol concentrations in glycol-water mixture
30—step of transmitting signal of a waveform in medium
32—step of receiving signal which traversed through medium
34—step of looking up solute concentration using solute concentration vs. pulse width table
36—step of predicting required concentration based on historical and predicted temperature data
38—step of selecting lower of historical and predicted temperature data
40—step of comparing required concentration and actual concentration
42—step in which concentration is indicated as unsuitable
44—historical temperature data input
46—predicted temperature data input
48—step of determining actual total volume and concentration of solute and solvent
50—step of determining additional volume of solute to result in at least target concentration
52—step of determining whether aggregate of actual total volume of solute and solvent and additional volume of required solute exceeds limited volume
54—step of indicating that additional required solute is needed to be added to solution
56—step of determining required drain volume and required solute volume
58—column representing required percentage of glycol
60—column representing ambient temperature
62—control device
64—internet
66—fill valve Particular Advantages of the Invention The present thermal battery operational condition monitoring and alert system of a thermal battery removes the need for multiple devices for detecting various conditions, e.g., low thermal battery content level, a leak condition of the thermal battery, devices or fluid conductors connected to the thermal battery, concentration of solution for determining suitability of the thermal battery content to function as a thermal storage substance and a thermal storage fluid to ensure optimal operating conditions of the thermal battery. As a thermal battery may be disposed outdoors even in a temperate region, an overly low ambient temperature can threaten the proper functioning of the thermal battery as its contents may freeze or become slushy, affecting the ability of the thermal battery to store thermal energy.

The present thermal battery operational condition monitoring and alert system utilizes historical weather conditions of a locale, weather forecast data and the present weather conditions to more optimally anticipate the weather conditions of the locale in order to more accurately determine the suitability of the contents of a thermal storage device to avoid unnecessary use of more glycol than the necessary amount in the thermal storage medium to ensure the mixture does not freeze and can serve properly as a working fluid or a heat transfer fluid.

The present thermal battery operational condition monitoring and alert system utilizes ubiquitous electrodes coupled with signal processing techniques to produce signals corresponding to the lack of detection of a liquid (or a liquid level low condition) and the detection of the liquid at a concentration, therefore making the system less costly to procure or to maintain as the ubiquitous electrodes are generally robust against a wide range of ambient conditions.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

FIG. 1 is a diagram depicting the use of a pair of electrodes 4 configured for use as a glycol concentration sensor 2 in a thermal battery 6. Disclosed herein are examples showing a manner in which the glycol concentration sensor 2 may be used not only for measuring the concentration of glycol of the glycol-water mixture contained therein but also a manner in which the glycol concentration sensor 2 may be used to detect a condition where there is an insufficient amount of glycol-water mixture disposed therein for the glycol-water mixture 8 to function as a heat transfer liquid for the thermal battery 6. The thermal battery 6 essentially includes a storage container in which a thermal storage medium, e.g., glycol-water mixture, is stored. A fluid conductor 58 disposed through the storage container allows a fluid, e.g., potable water, carried therein to be heated by thermal energy stored therein. Thermal energy in the thermal battery 6 is replenished by a circulation, e.g., motivated by a pump, of a portion of the glycol-water mixture 8 that exits the container via an outlet 16 of the container to receive thermal energy directly or indirectly from a heat source before returning to the container via an inlet 14 to the container. In this example, the normal level of glycol mixture required for proper functioning of the system is at level 10. The electrodes 4 are disposed at a level sufficient to detect the concentration of glycol. A drop in the level beyond this point to a low level 12 causes the electrodes to fail in detecting a response through a liquid medium within a predetermined amount of time, e.g., one second. This failure is useful to indicate that an inadequate level of glycol-water mixture or an insufficient amount of glycol-water mixture and therefore an investigation into the potential of a leak and/or a replenishment of the mixture is potentially advised. A warning notification may be communicated by a control device of the glycol concentration sensor to a stakeholder of the heating system including the thermal battery such that the cause for such an indication of a low medium level can be investigated and potentially addressed. A low medium level can indicate a leak. Any potential leak locations should be checked and verified that a leak has not occurred at those locations. Among other sources of leakages, leakages can occur due to faulty connection/s to the thermal storage tank or evaporations through these faulty connections that expose the contents of the thermal storage tank to its surroundings. The electrodes 4 may be mounted in a number of configurations so long as the electrical conductivity afforded by the contents of the thermal battery 6 reflects the appropriate levels of the contents corresponding to an operating level and a level indicating insufficiency. Care shall be taken to ensure that the thermal battery 6 is disposed in a level posture so that the level of the contents disposed therein is predictable.

Figure 2:
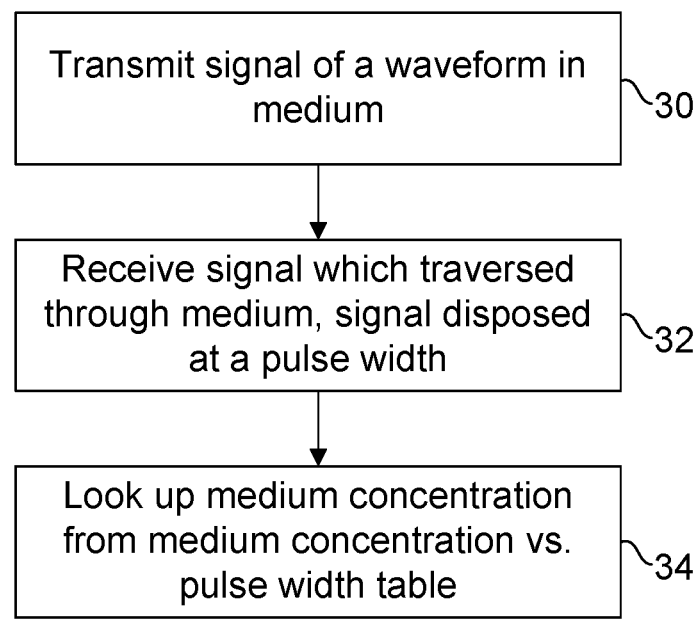
FIG. 2 is a diagram depicting a method useful for determining glycol concentration in a glycol-water mixture.

FIG. 2 is a diagram depicting a method for determining the concentration of a solute of a thermal storage medium, e.g., in a glycol-water mixture. In one embodiment, the solute is glycol. In one embodiment, the thermal storage medium is a glycol-water mixture. First, a signal of a waveform is transmitted in a portion of the thermal storage medium as shown in step 30. The signal of the waveform disposed at a pulse width is received as shown in step 32. The concentration of glycol in the thermal storage medium is then looked up as shown in step 34 based on a signal pulse width-thermal storage medium concentration relationship corresponding to the pulse width.

Figure 4:
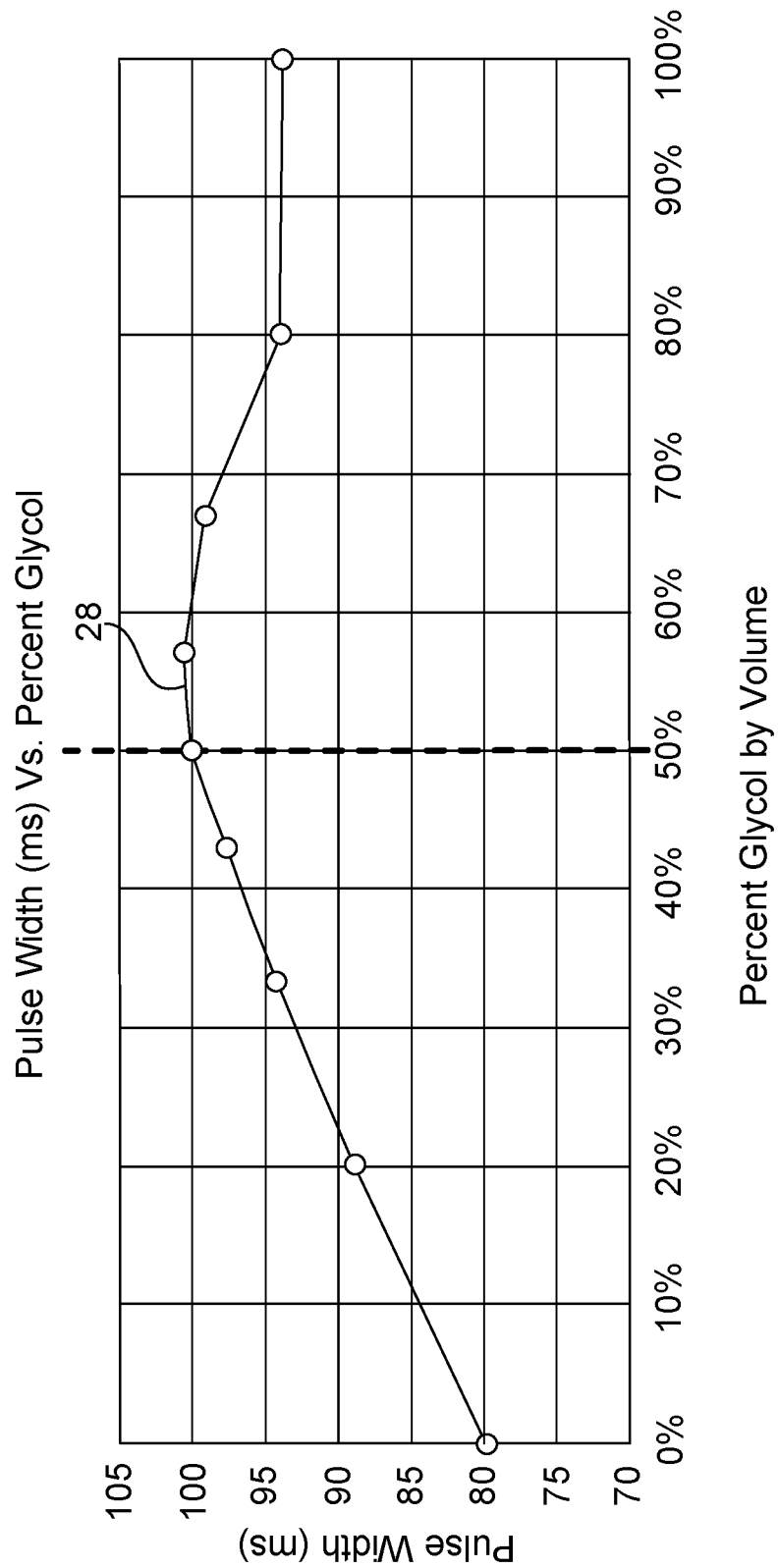
FIG. 4 is a plot depicting a relationship between pulse widths with respect to glycol concentrations according to the table shown in FIG. 3.

FIG. 3 is a table depicting example response times representing pulse widths of the transmitted square waveforms at various glycol concentrations. FIG. 4 is a plot depicting a relationship between pulse widths with respect to glycol concentrations according to the table shown in FIG. 3. In order to look up the concentration of glycol in a glycol-water mixture, a table 20 as shown in FIG. 3, or chart 28 as shown in FIG. 4, correlating pulse widths, e.g., expressed in time periods, e.g., in ms, and percentages of glycol, e.g., expressed in percentage of glycol by volume, must first be created. Referring to FIG. 2, column 22 represents the percentages by volume of water, column 24 represents the percentages by volume of glycol and column 26 represents pulse width in time periods. In one embodiment, the signal pulse width-solute concentration in thermal storage medium relationship is established using a method including establishing the signal pulse width-solute concentration in thermal storage medium relationship using at least readings of signal pulse width of at least two different solute concentrations in thermal storage medium. In one embodiment, the waveform is a square waveform to make it easy to discern the deliberately transmitted signals useful for measuring the concentration of glycol in the glycol-mixture from stray signals that can potentially occur in the thermal battery. It shall be noted from the plot 28 representing pulse widths relative to glycol concentrations in glycol-water mixture that beyond a glycol concentration of about 50% by volume, the pulse widths start to taper off, no longer representing a proportional relationship that links the pulse widths and the glycol percentage by volume. Applicant discovered that no significant gains in thermal storage properties can be made for a glycol-water mixture beyond about the concentration of 50% of volume. Applicant further discovered that the ability of the mixture in resisting freezing is not significantly affected if the operating range of the glycol concentration glycol-water mixture is limited to about 50% by volume, i.e., a concentration falling in a range of the pulse-widths vs. concentrations chart, i.e., the lower half of the chart, where the concentration of glycol can be substantially accurately predicted.

FIG. 5 is a table depicting example required glycol concentrations with respect to ambient temperature values. Column 58 represents the required percentages of glycol by volume in a glycol-water mixture while column 60 represents the corresponding ambient temperature the glycol-water mixture is exposed to. It shall be noted that the lower the ambient temperature, the higher the required glycol concentration will be to prevent freezing and continue to have the mixture disposed in a liquid form instead of a slushy form which hinders efficient thermal transfer and circulation of the mixture.

Figures 6, 7:
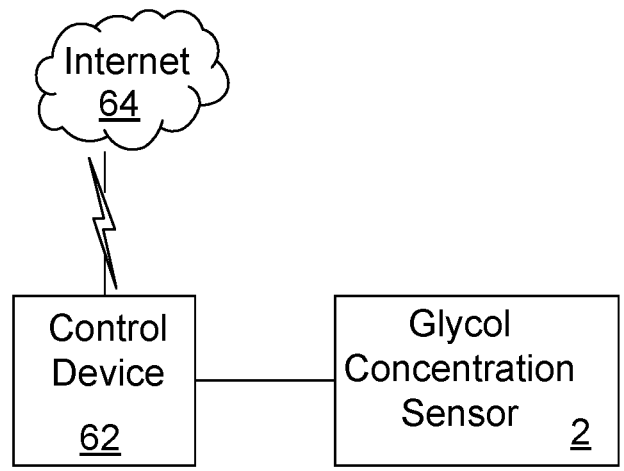
FIG. 6 is a diagram depicting a glycol concentration sensor and a control device to which it is functionally connected.
FIG. 7 is a table depicting example required glycol concentrations with respect to locales or zip codes of the locales.
Figure 8:
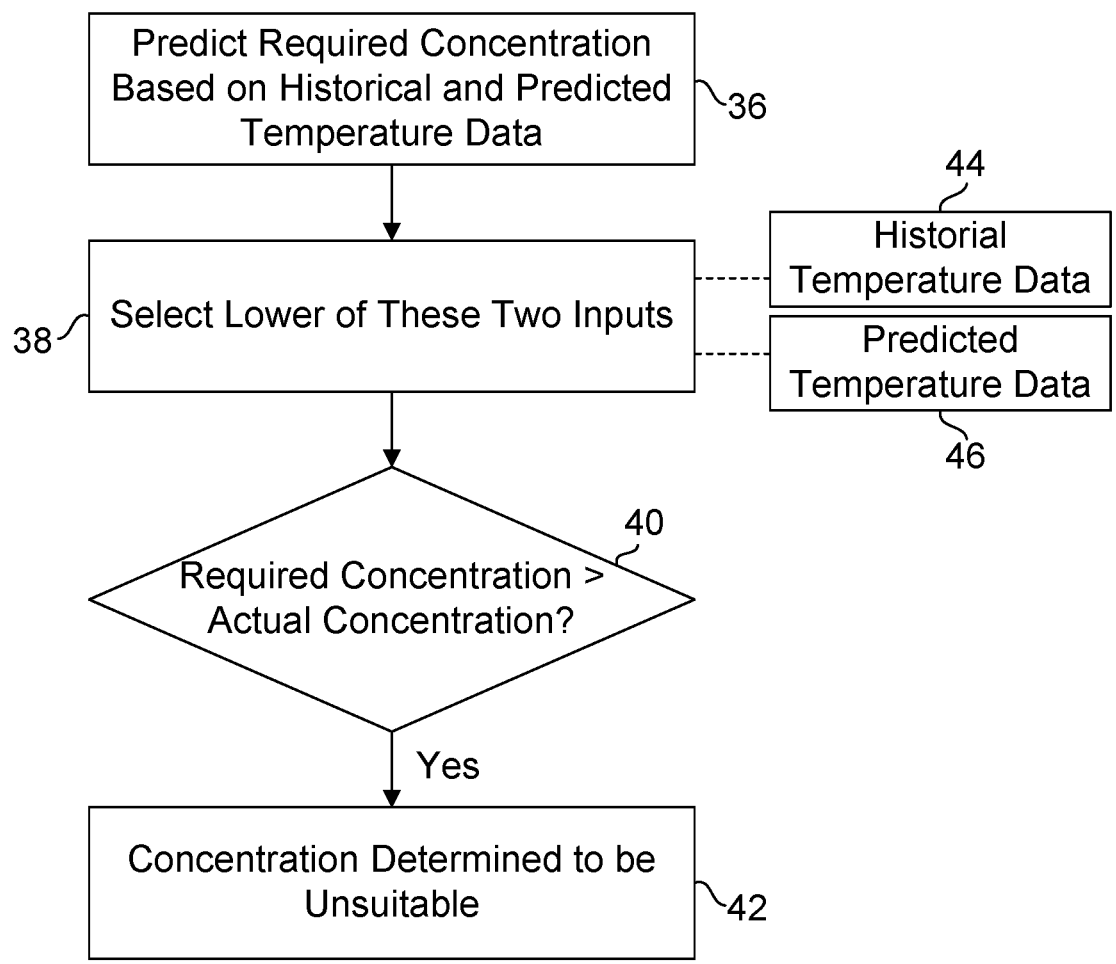
FIG. 8 is a diagram depicting a method useful for determining the suitability of a glycol-water mixture for use in an outdoor environment where the ambient climate is unregulated.

FIG. 6 is a diagram depicting a glycol concentration sensor and a control device to which it is functionally connected. A glycol concentration sensor 2 is functionally connected to a control device 62 which is in turn functionally connected to the internet 64. The control device 62 can be a control device that is already available in a water heating system or it can be a dedicated controller. The internet 64 allows the control device 62 access to current weather data including the current ambient temperature and forecasted ambient temperature. FIG. 7 is a table depicting example required glycol concentrations with respect to locales or zip codes of the locales. In this example, the minimum temperature in a locale with zip code "55401" is predicted to be 18.7 degrees F. while the historical data indicates that the minimum temperature for the same time period is 13.8 degrees F. Next, the suitability of the current glycol concentration is then determined by control device 62 as shown in FIG. 8. FIG. 8 is a diagram depicting a method useful for determining the suitability of a glycol-water mixture for use in an outdoor environment where the ambient climate is unregulated. The method is useful for determining the suitability of a thermal storage medium of a thermal battery based in a locale with the benefit of access to the internet for weather data as shown in FIG. 6. The method includes predicting a required concentration of the thermal storage medium as shown in step 36 based on historical temperature data 44 of the locale and predicted temperature data 46 of the locale. The required concentration of the thermal storage medium is predicted based upon a concentration of the thermal storage medium corresponding to the historical temperature data 44 and the predicted temperature data 46. In the embodiment shown, the predicting step further includes resolving the required concentration of the thermal storage medium to be a concentration of the thermal storage medium corresponding to the lower of the historical temperature data 44 and the predicted temperature data 46 as shown in step 38. It shall be noted that the lower of the two temperature values, i.e., 13.8 degrees F., is used in the consideration of the required glycol concentration to minimize the possibility that the required glycol concentration would not be sufficiently high. The concentration of the thermal storage medium is then determined and compared to the required concentration of the thermal storage medium as in step 40. If the required concentration of the thermal storage medium is higher than the concentration of the thermal storage medium, the thermal storage medium is the to be unsuitable as in step 42. As the required glycol concentration by volume is computed to be about 25%, a value higher than the current glycol concentration by volume of 20%, a correction to the glycol concentration is required. In one embodiment, the predicted temperature data is a part of weather forecast data of the locale. In one embodiment, the determining step includes transmitting a signal of a waveform in a portion of the thermal storage medium; and receiving the signal of the waveform disposed at a pulse width and looking up the concentration of the thermal storage medium on a signal pulse width-thermal storage medium concentration relationship based on the pulse width as shown in FIG. 2. If the glycol concentration of a glycol-water mixture has been determined to be insufficient, an act to correct the concentration may not be simply adding more solid glycol to the existing thermal storage medium having its concentration that is to be remediated as the total or final amount of the thermal storage medium may exceed the thermal battery storage capacity. Draining the entire thermal battery is impractical, wasteful and costly and it is a practice that should not be used. Instead, Applicant discovered that if necessary, only a relatively small portion of the medium will need to be replaced to get the glycol concentration corrected.

FIG. 9 is a diagram depicting various considerations affecting the manner in which the concentration of a volume-limited application is modified. Referring back to FIG. 1, the thermal battery 6 may be filled initially at factory with a solute, e.g., glycol. Once on site, the thermal battery may then be filled with a solvent, e.g., water, via fill valve 66. In this example, the glycol concentration of a thermal storage medium needs to be modified from about 20% by volume to at least about 25% by volume. With the concentration actually at about 20%, the amounts of water and glycol in a thermal battery container that is limited to a volume of about 60 gallons are about 48 gallons and about 12 gallons, respectively. Simply adding more glycol to increase the concentration will not be an option as the eventual volume of the newly modified concentration will exceed that of the container capacity. To result in a concentration that is at least about 30%, the amount of glycol will be about 15 gallons while the amount of water will be about 45 gallons. In the actual medium, for about 45 gallons of water, there is dissolved about 11.25 gallons of glycol. As a total of about 15 gallons of glycol is needed, the container will need another about (15−11.25)=3.75 gallons of glycol. However, in a field application, it may be impractical to require that a calculated volume of the medium to be drained, i.e., about (48−45)=3 gallons of medium. For the sake of convenience, a fixed volume, afforded by a 5-gallon bucket may be used instead. In this case, the drained volume is 5 gallons of the pre-modified medium, reducing the remaining glycol volume to about 11 gallons. Instead of adding just the required glycol of about 3.75 gallons, a 5-gallon bucketful of glycol is added for convenience. The final actual concentration is now disposed at about 27%, i.e., a value exceeding the required concentration of about 25%. It shall be noted that the modification of the required drain volume is exactly one time the volume of a fixed bucket volume. It is possible that more buckets' worth of modification may be required if the concentration increase had been more severe. In another scenario, if the concentration of a severely low level of medium is known and a modification of the glycol concentration can be performed without first draining the medium, more glycol can simply be added.

Figure 10:
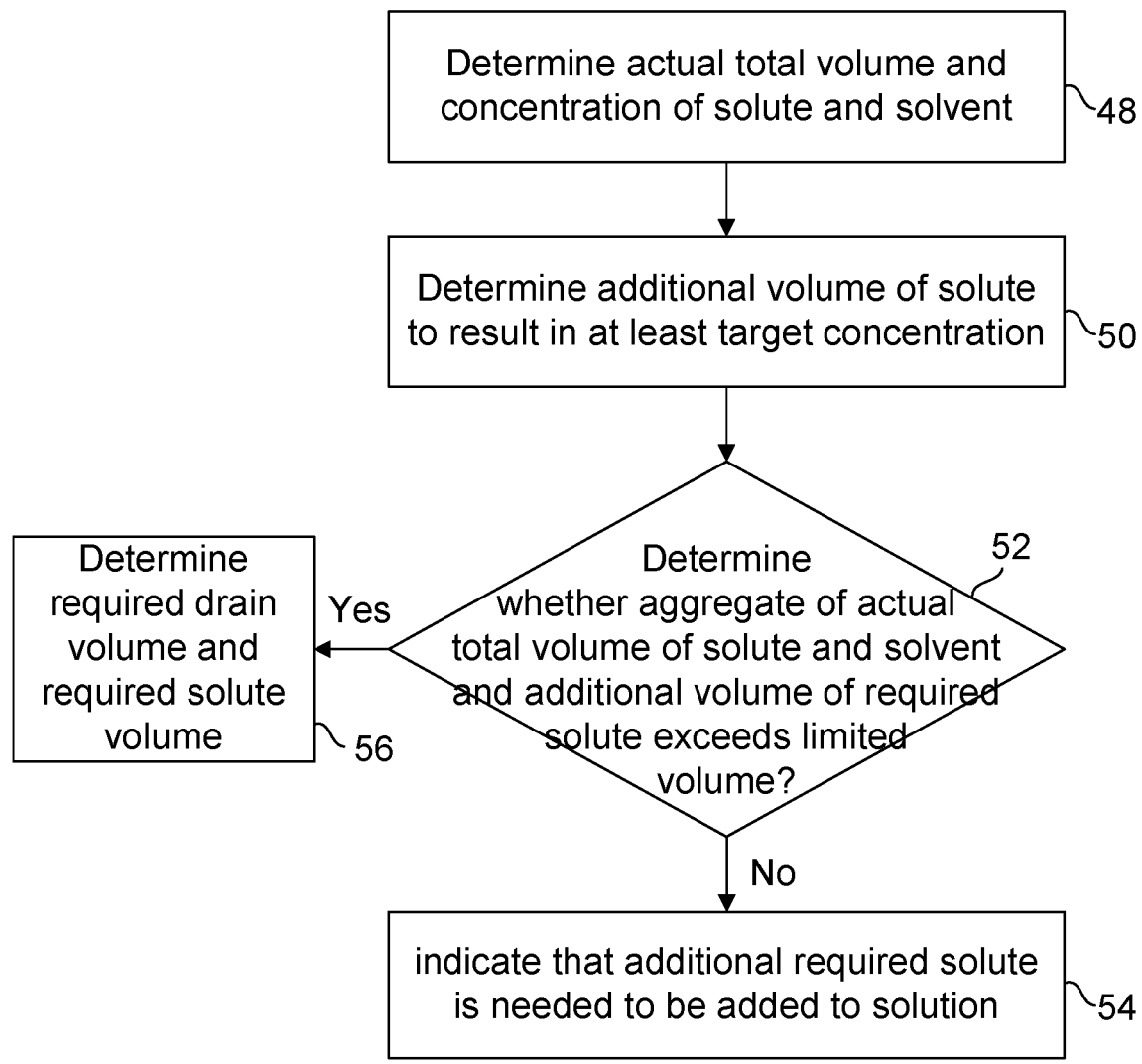
FIG. 10 is a diagram depicting a method useful for determining the required actions and materials for modifying the concentration of a substance in a volume-limited application.

It can then be summarized as shown in FIG. 10 that in a method for determining a modification of the concentration of a solution in a container to meet a target concentration of the solution in a limited volume of a container, the method includes first determining an actual total volume of the solution and a concentration of the solute in the solution as shown in step 48. An additional volume of the solute required to result in a concentration of the solution that is at least at the target concentration is then determined as shown in step 50. It is then determined as in step 52 whether an aggregate of the actual total volume of the solution and the additional volume of the solute required exceeds the limited volume. If the aggregate does not exceed the limited volume, the additional volume of the solute required is determined to be needed to turn the actual total volume of the solution into a solution at the target concentration as shown in step 54. If the aggregate exceeds the limited volume, a required drain volume from the container and an additional volume of solute required to be added to container to result in a solution at least at the target concentration is determined as shown in step 56.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for determining the suitability of a thermal storage medium of a thermal battery based in a locale, said method comprising using a control device to:
   (a) predict a required concentration of the thermal storage medium based on historical temperature data of the locale and predicted temperature data of the locale, said predicted temperature data of the locale is a part of weather forecast data of the locale, wherein said required concentration of the thermal storage medium is predicted based upon a concentration of the thermal storage medium corresponding to said historical temperature data and said predicted temperature data;
   (b) determine the concentration of the thermal storage medium and comparing the concentration of the thermal storage medium to said required concentration of the thermal storage medium, wherein if said required concentration of the thermal storage medium is higher than the concentration of the thermal storage medium, the thermal storage medium is indicated by the control device as unsuitable; and
   (c) if the thermal storage medium is indicated by the control device as unsuitable, correct the concentration of the thermal storage medium to at least said required concentration of the thermal storage medium.

2. The method of claim 1, wherein the thermal storage medium comprises glycol.

3. The method of claim 1, wherein said predicting step comprises resolving the required concentration of the thermal storage medium to be a concentration of the thermal storage medium corresponding to the lower of said historical temperature data and said predicted temperature data.

4. The method of claim 1, wherein said determining step comprises:
   (a) transmitting a signal of a waveform in a portion of the thermal storage medium; and
   (b) receiving the signal of the waveform disposed at a pulse width and looking up the concentration of the thermal storage medium on a signal pulse width-thermal storage medium concentration relationship based on said pulse width.

5. The method of claim 4, wherein the waveform is a square waveform.

6. The method of claim 1, wherein the locale is specified by a zip code.

7. A method for determining the concentration of a solute of a thermal storage medium using a pair of electrodes of a glycol concentration sensor, said method comprising:
   (a) transmitting a signal of a waveform through a first electrode of the pair of electrodes in a portion of the thermal storage medium, the concentration of the solute of the thermal storage medium being a function of the electrical conductivity of the signal within the thermal storage medium; and
   (b) receiving the signal of the waveform disposed at a pulse width through a second electrode of the pair of electrodes and looking up the concentration of the solute in the thermal storage medium based on a signal pulse width-solute concentration in thermal storage medium relationship corresponding to said pulse width.

8. The method of claim 7, wherein the thermal storage medium is a glycol-water mixture.

9. The method of claim 7, wherein said signal pulse width-solute concentration in thermal storage medium relationship is established using a method comprising establishing said signal pulse width-solute concentration in thermal storage medium relationship using at least readings of signal pulse width of at least two different solute concentrations in thermal storage medium.

10. The method of claim 7, wherein the waveform is a square waveform.

11. The method of claim 7, wherein if said receiving step fails to receive the signal of the waveform within a predetermined amount of time, it is said that there is an insufficient level of the thermal storage medium.

* * * * *